Sept. 3, 1940.　　　W. F. ALLENBY　　　2,213,728
COOKING APPARATUS
Original Filed Sept. 3, 1938
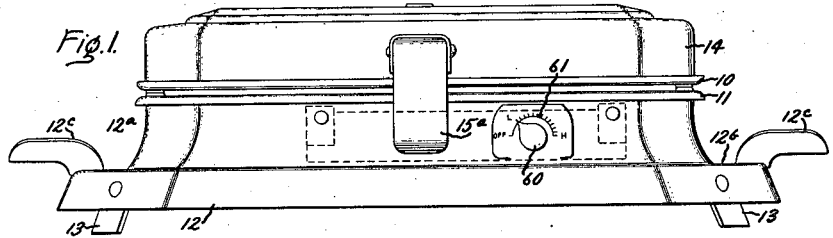
Fig. 1.
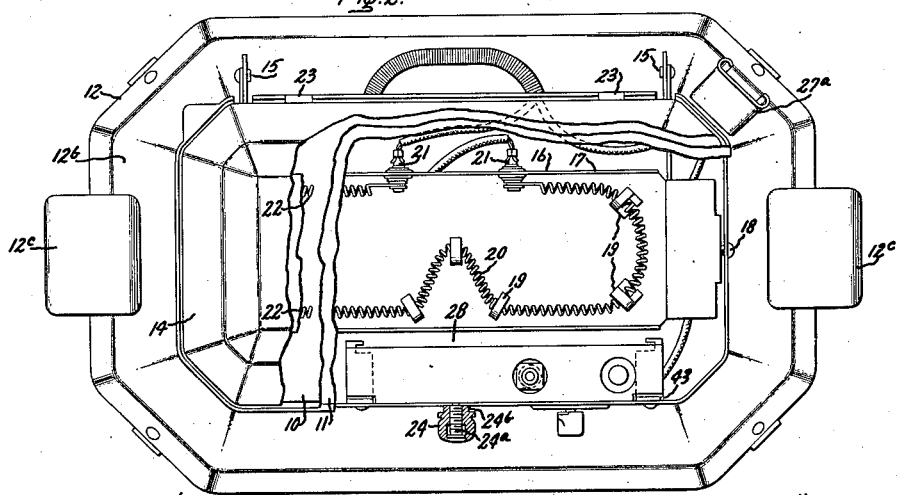
Fig. 2.
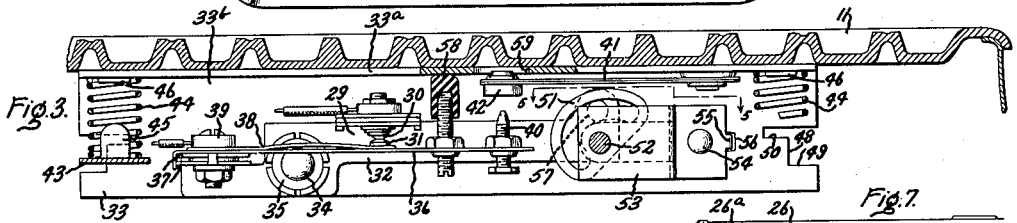
Fig. 3.
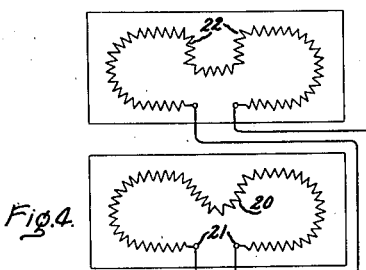
Fig. 4.
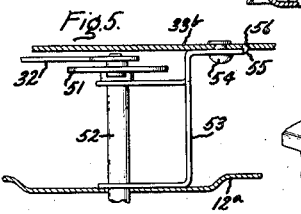
Fig. 5.
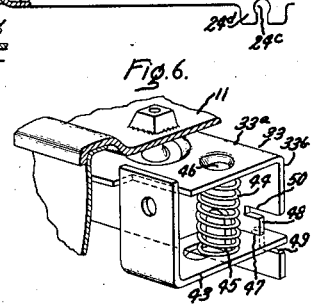
Fig. 6.
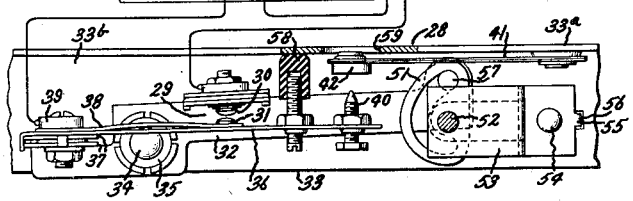
Inventor:
William F. Allenby,
by Harry E. Dunham
His Attorney.

Patented Sept. 3, 1940

2,213,728

UNITED STATES PATENT OFFICE 2,213,728

COOKING APPARATUS

William F. Allenby, Bridgeport, Conn., assignor to General Electric Company, a corporation of New York Original application September 3, 1938, Serial No. 228,366. Divided and this application September 15, 1939, Serial No. 294,993

4 Claims. (Cl. 219—19)

This invention relates to cooking apparatus, more particularly to cooking apparatus provided with a plurality of separable cooking plates, and it has for its object the provision of an improved device of this character which is automatically controlled in accordance with the temperature of the plates.

This application is a division of my copending joint application with August A. Propernick, Serial No. 228,366, filed September 3, 1938, and assigned to the same assignee as this invention.

This invention is particularly applicable to cooking apparatus provided with a pair of superposed, separable, electrically heated cooking plates, and is especially useful in connection with cooking apparatus of this character having interchangeable grill and waffle grid plates. The grill plates have smooth, flat cooking surfaces, and are used for such cooking operations as toasting sandwiches, broiling meat, baking griddle cakes, etc. The waffle grid plates are used, of course, only when it is desired to bake waffles.

Electrical resistance heating elements are provided for applying heat to both of the plates of each set, irrespective of which are used.

In a copending application of August A. Propernick, Serial No. 294,984, filed September 15, 1939, as a division of the prior joint application above referred to and assigned to the same assignee as the present invention, there are described and claimed features which are incorporated in the cooking apparatus of the present application in which means are provided for automatically controlling the heating elements in accordance with the temperature of the cooking plates, whether they be the grill plates or the waffle grids. This controlling means comprises a temperature responsive element for controlling the heating elements yieldingly biased into direct thermal engagement with one of the pair of plates of the set that is being used.

In accordance with my present invention, means are provided for supporting the temperature responsive element so that it can be readily assembled with and detached from the cooking apparatus.

For a more complete understanding of this invention, reference should be had to the accompanying drawing in which Fig. 1 is a front elevation of an electrically heated cooking apparatus embodying this invention; Fig. 2 is a plan view of the apparatus shown in Fig. 1, portions being broken away so as to illustrate certain details of construction; Fig. 3 is an enlarged fragmentary sectional view taken through a part of the apparatus shown in Figs. 1 and 2; Fig. 4 is a fragmentary view showing certain of the elements of Fig. 3 in different operative positions than they have in Fig. 3, and also illustrating diagrammatically electrical heating elements for the cooking plates of the cooking apparatus of Figs. 1, 2, and 3; Fig. 5 is a sectional view taken through the line 5—5 of Figs. 3 and 4 and looking in the direction of the arrows; Fig. 6 is a perspective view illustrating a portion of the mechanism shown in Figs. 3 and 4 and their relation to a waffle grid; Fig. 7 is a fragmentary view partly in section illustrating one of the grill cooking plates that may be used in the cooking apparatus of Figs. 1 and 2, the plate being shown on a reduced scale.

Referring to the drawing, this invention has been shown in one form as applied to electric cooking apparatus of the general character described and claimed in the United States patent to R. L. Uhl No. 2,009,792, dated July 30, 1935.

This cooking apparatus comprises a pair of superposed upper and lower cooking plates 10 and 11. The plate 11 is mounted in a base 12 which, as shown, has an upright side wall 12a in the upper end of which the lower plate is mounted, and also is provided with a substantially horizontal tray-like wall 12b. Handles 12c are attached to the opposite ends of the wall 12b. The base is supported by feet 13.

The upper plate 10 is mounted in an upper casing 14 which is hinged to the base 12 by hinge structure 15 which will preferably be arranged as described in the above-mentioned Uhl patent. This upper casing is provided with a pivotally mounted handle 15a.

Mounted in the base 12 below the lower plate 11 is a suitable heating element 16 which has a channel-like supporting member 17 supported at its ends to the ends of the base wall 12a by means of screws 18. Mounted within the support 17 are a plurality of spaced electrically insulating supports 19 through which a suitable coiled resistance conductor 20 is threaded, as shown in Fig. 2. The ends of this resistance coil are brought to points adjacent each other and are connected to suitable terminals 21. It will be understood that the upper casing 14 will support a heating element 22 (Fig. 4) similar to that just described and mounted in the base 12, and positioned above the upper plate 10. The two heating elements are supported in close thermal relation with the plates, and they hold substantially the same temperatures in the plates.

The upper and lower plates 10 and 11 are removably mounted in the casing 14 and base 12 substantially in the manner disclosed in the above Uhl patent. For this purpose, the rear of each plate is provided with a pair of spaced lugs 23 which are directed through apertures provided for them in the rear of the base or casing, as the case may be; and at the front the plate is secured by means of a nut 24 threaded on a screw 24a that is mounted in the associated base or casing. The nut has a reduced section 24b which when the nut is threaded in is received in an opening 24c provided in a part 24d of the plate that lies in front of the front wall of the associated base or casing when the plate is in cooking position. When it is desired to remove the plates, it is merely necessary to withdraw the nuts 24, and to then move the plates outwardly to withdraw their lugs 23 from their slots at the rear.

Waffle grid plates 10 and 11 have been shown in Figs. 1, 3, and 6. It will be understood, however, that these are interchangeable with grill plates 26, such as shown in Fig. 7 on a reduced scale, and which have a plane cooking surface 26a. Outside of the cooking surface the grill plates have about the same construction as the waffle grids and are detachably mounted in the base and top casing 14 in the same manner. Generally, however, they will be thicker.

Mounted on the vertical wall 12a of the base 12 are a pair of twin supply terminals 27 (Fig. 4) that are housed in a terminal guard (Fig. 2) 27a. As shown in Fig. 4, one of the terminals 27 is connected to one of the terminals of the upper heating element 22, the opposite terminal of which is connected to one of the terminals of the lower heating element 20. The opposite terminal of this element is connected to the other supply terminal 27 through a suitable temperature control device 28.

The temperature control device 28 arranged in accordance with this invention comprises a switch 29 which is connected in the circuit between the other supply terminal 27 and the heating elements, as shown in Fig. 4. The switch comprises a relatively fixed contact 30 and a movable contact 31. The fixed contact 30 is mounted in a rigid arm 32. This arm is pivoted at its left-hand end, as viewed in Figs. 3 and 4, to a metallic supporting member 33. This supporting member, as shown, has a right-angle form to define a horizontal leg 33a and a vertical leg 33b. The switch arm is pivotally mounted on the vertical leg by means of a rivet 34, and the arm is frictionally held by means of a spring washer 35 interposed between the rivet 34 and the switch arm 33 so as to bias the switch arm into frictional engagement with the wall 33b.

The contact 31 is mounted on a flexible switch blade 36 which is secured at its left-hand end to the switch arm 32 and which is insulated from this arm by sheets of mica 37. Connected with the contact 31 is a lead 38 which also is connected with a binding post 39 on the switch arm by means of which electrical connection with the heating elements is made as shown in Fig. 4.

The right-hand end of the flexible switch arm 36, as viewed in Figs. 3 and 4, carries an adjustable screw 40 which is arranged to be engaged and operated by a metallic temperature responsive element 41 to control the movement of the switch contact 31 toward and away from the fixed contact 30. The bi-metallic element 41 preferably is of strip or bar form having its right-hand end, as viewed in Figs. 3 and 4, rigidly secured to the upper horizontal section 33a of the support 33 and having its left-hand end free to move vertically responsively to temperature changes. It will be understood that the bi-metallic bar 41 will be formed of two metals having dissimilar coefficients of expansion, such as Invar and nickel.

The free end of the bi-metallic bar 41 carries an electrically insulating button 42 which is arranged to engage the screw 40 to move the switch arm 36 downwardly from its closed position of Fig. 3 to its open position of Fig. 4 when the temperature of the bi-metallic bar reaches a predetermined maximum. This, of course, interrupts the energizing circuit for the heating elements 20 and 22 to cut off heat from the plates to permit them to cool somewhat. When the thermostatic element 41 cools to a predetermined minimum in response to this cooling of the plates, it permits the flexible switch arm 36 to move to close the contacts to reapply the heat to the plates.

The support 33 is mounted in the base 11 so that its upper horizontal face 33a is yieldingly held into direct physical contact with the lower cooking plate that is being used. It is supported on a pair of spaced L-shaped brackets 43 which have their vertical legs rigidly secured to the vertical wall 12a of the base 12 in any suitable manner, as by riveting. The horizontal legs of the brackets extend inwardly into the base and serve to support the member 33. As shown, a pair of coiled compression springs 44 are interposed between the horizontal legs and the upper wall 33a of the support 33 so as to hold the support 33 up against the bottom surface of the lower cooking plate. The springs are retained at the bottom by upright tongues 45 formed upwardly from the material of the horizontal legs, and which are received in the lower coil of the springs. Preferably also, the upper plate 33a will be provided with cup-shaped depressed sections 46 which are received by the upper turns of the coils.

In accordance with this invention, the support 33 is guided in its vertical movement by means of slots 47 formed in the inner ends of the horizontal sections of the brackets, as shown more clearly in Fig. 6. These slots 47 receive the inner vertical edges of slots 49 provided in the end edges of the vertical wall 33b of the support 33. The bottom walls of these slots 49 function to limit the upward movement of the support 33 by engagement with the under surfaces of the brackets. The slots 48 are provided at their upper ends with deeper slots 50 which provide for the withdrawal or separation of the support 33 from the brackets. This may be accomplished by depressing the support 33 until the slots 50 register with the end sections of the brackets that define the outer walls of the slots 47, whereby the support may be freely moved outwardly from the brackets. It is reassembled in the same way only the support 33 is moved in the reverse directions. It will be understood that the bottom edge of the slot 49 will be positioned sufficiently far below the lower surfaces of the supporting brackets 43 so that the upper surface 33a will be forced by the springs 44 into direct thermal relation with the lower surface of the lower cooking plate.

The temperature adjustment of the control is effected by shifting the position of the switch arm 32. This is accomplished by means of a cam 51 secured to a shaft 52 that is mounted in a bracket 53 on the vertical wall 33b of the support 33. As shown, the bracket 53 is secured to this wall by means of a rivet 54. It is prevented from rotating by means of a tongue 55 on the bracket received in a slot 56 in the wall. A pin 57 is mounted on the front end of the switch arm 32 which is received in the cam 51 so that when the cam is rotated the switch arm is pivoted on its pin 34. The initial space between the screw 40 and the button 42 determines the temperature setting. If the switch arm be moved upwardly to reduce this space, the temperature setting is lowered; whereas if it be moved downwardly to increase this space the temperature setting is increased.

An "off" position of the switch is obtained by an electrically insulating abutment 58 mounted on the flexible switch blade 36 and which is adapted to engage the under surface of the horizontal plate 33b. It will be observed that if the switch arm 32 be moved upwardly sufficiently far to cause the abutment to engage this under surface, upon continued upward movement of the switch arm, the contact 30 will be carried by the switch arm away from the contact 31 to open the switch, as shown in Fig. 4.

Preferably, the upper plate 33b will be provided with an aperture 59 opposite the button 42 on the thermostat so as to obviate stresses in the bimetallic bar 41 as it cools down to room or low temperatures.

Also, the shaft 52 will protrude through the front wall of the base 12, as shown in Fig. 5, and a knob 60 will be secured on the protruding end of the shaft, whereby the attendant may conveniently adjust the setting of the control device. And also, it is preferable that this front wall 12 will be provided with a scale 61 to assist the attendant in setting the control. This scale also will be provided with the word "Off" to indicate the off position of the control knob 60.

In the operation of the device, it will be understood that if the grill plates 26 are being used for the purpose of frying meat, baking pan cakes, toasting sandwiches and the like, the temperature control will function to hold a fairly close temperature in the plates. When the plates reach the desired temperature set by the knob 60, the thermostat will deenergize the heating elements whereupon the plates will cool somewhat; the thermostat in response to the cooling of the plates will reapply heat to the plates. If the knob 60 be moved on the scale toward the end denoted "H" (denoting "high") the temperature of the plates will be increased; conversely, if it be moved toward "L" (denoting "low") the plate temperature will be reduced.

Likewise, if the waffle grids 10 and 11 be used, the temperature control device will control the temperature of the plates. Here, however, if relatively thin waffle grids be used, such as shown in the drawing, and batter be poured into them when they are at a baking temperature, the temperature of the plates will be lowered rapidly, which operation will cause the thermostat to immediately reapply heat to the plates. When the plates are again brought up to their initial temperature, the waffles will be cooked sufficiently. In this case, the thermostat functions as a timing device to measure the cooking periods. If the knob be moved toward "High" on the scale, the waffles will be browned to a greater degree. If the knob be moved toward "Low" they will be lighter.

It will be understood that even though the grill and waffle plates vary in thickness, and even though the plates of each set may vary due to inaccuracies in manufacture, the springs 44 will force the upper surface 33a of the thermostat support into direct thermal relation with the bottom of the lower plate. That is, the bimetallic bar 41 will always be forced into good thermal relation with the lower plate.

If it be desired to remove the support 33 for any reason such for example as to repair the thermostat or to substitute for it another control means of the same type, the cooking plate is removed and the support depressed until the slots 50 register with the outer edges of the horizontal sections 43 of the supporting brackets. When this is done, the support 33 may be slid inwardly from the brackets to remove it. It may be replaced by a reverse operation.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. Cooking apparatus comprising a cooking plate, means for heating said plate, a temperature responsive element controlling said heating means, a heat conducting support for said temperature responsive element, supporting means for said heat conducting support, connection means interlocking said support and supporting means providing for relative movement between them so that said support can be moved against said cooking plate, and said connection means constructed and arranged to provide for disengagement of said support from said supporting means when said support is moved to a predetermined position with relation to said supporting means, and yielding means biasing said support toward said cooking plate.

2. Cooking apparatus comprising a base, a cooking plate removably mounted in said base, an electric heating element for applying heat to said plate, a heat conducting plate, a thermostat on said heat conducting plate controlling said heating element, brackets in said base having an interlocked connection with said heat conducting plate providing for its movement toward and away from said cooking plate, and for the disengagement of said heat conducting plate from said brackets when moved to a predetermined position away from said cooking plate, and springs interposed between said brackets and said heat conducting plate biasing said heat conducting plate toward said cooking plate.

3. Cooking apparatus having a base, a cooking plate removably mounted in a horizontal position on said base, a heating element for said plate, a pair of brackets under the cooking plate supported by the base in spaced-apart relation, a metallic support below said cooking plate having a section of substantial area in direct thermal relation with the under surface of said cooking plate and a vertical section having its opposite edges received in slots in said brackets so as to permit said support to move vertically toward and away from said cooking plate, springs between said brackets and support biasing the support upwardly to hold said area against said cooking plate, the vertical section having slots extending in from said opposite edges adapted when the support is depressed to a predetermined position to receive the end sections of said brackets outside of the slots therein, thereby permitting said support to be removed from said brackets, and a temperature responsive element controlling said heating means mounted on said horizontal section in direct thermal relation with it.

4. Cooking apparatus having a removable cooking plate, a base for the plate and a heating element for said plate, a pair of brackets under the cooking plate supported by the base in spaced-apart relation, a metallic support below said cooking plate having an elongated horizontal section of substantial area in direct thermal relation with the under surface of said cooking plate and a vertical section having its opposite edges received in slots in the end sections of said brackets so as to permit said support to move vertically with reference to the brackets, springs between said brackets and support biasing the support upwardly to hold its horizontal section against the cooking plate, the vertical section having slots extending in from said opposite edges which are adapted when the support is depressed to receive the end sections of said brackets outside of the slots therein, thereby permitting said support to be removed from said brackets, and a temperature responsive element controlling said heating means mounted on said horizontal section in direct thermal relation with it.

WILLIAM F. ALLENBY.